US009341304B2

(12) United States Patent
Osiecki et al.

(10) Patent No.: US 9,341,304 B2
(45) Date of Patent: May 17, 2016

(54) MODULAR FILTRATION FRAME ASSEMBLY

(71) Applicant: Pall Corporation, Port Washington, NY (US)

(72) Inventors: Scott W. Osiecki, Skaneateles, NY (US); David A. Furth, Skaneateles, NY (US); Mark A. Ferguson, Memphis, NY (US); Jonathan A. Fitch, Skaneateles, NY (US); Michael Fox, Manlius, NY (US); Seiya Ohta, Ithaca, NY (US); Todd B. Abernethy, Skaneateles, NY (US)

(73) Assignee: Pall Corporation, Port Washington, NY (US)

( * ) Notice: Subject to any disclaimer, the term of this patent is extended or adjusted under 35 U.S.C. 154(b) by 37 days.

(21) Appl. No.: 14/201,840

(22) Filed: Mar. 8, 2014

(65) Prior Publication Data

US 2015/0252935 A1    Sep. 10, 2015

(51) Int. Cl.
*F16L 3/16*    (2006.01)
*F16M 1/00*    (2006.01)
(Continued)

(52) U.S. Cl.
CPC ............. *F16M 1/00* (2013.01); *B01D 29/15* (2013.01); *B01D 29/52* (2013.01); *F16L 3/08* (2013.01); *F16L 3/22* (2013.01); *F16L 3/221* (2013.01); *B01D 2201/0492* (2013.01); *Y10T 29/49826* (2015.01)

(58) Field of Classification Search
CPC ............. F16L 3/24; F16L 3/1091; H02G 3/32
USPC ............................. 248/235, 250, 68.1, 65, 49
See application file for complete search history.

(56) References Cited

U.S. PATENT DOCUMENTS 835,059 A  *  11/1906  Curley ........................... 182/130
1,380,570 A       6/1921  Lehman
(Continued)

FOREIGN PATENT DOCUMENTS

EP    1690579 A1    8/2006

OTHER PUBLICATIONS

Extended European Search Report in corresponding European Patent Application No. 15157600.6, mailed Jul. 30, 2015.

*Primary Examiner* — Shin Kim
(74) *Attorney, Agent, or Firm* — Leydig, Voit & Mayer, Ltd.

(57) ABSTRACT

A modular filtration frame assembly is provided for holding components of a pipe system and filtration system. The modular frame assembly comprises a skid formed by a base and a central spine. The base has at least two legs and at least one lateral support disposed between the two legs, and the central spine has two uprights and at least one cross bar disposed between the two uprights. A component support member is attached to the central spine for supporting components of the pipe system. In the modular frame assembly, the base, central spine and component supports can be formed by selecting from predetermined and presized components in response to the design and size of the pipe system and filtration system. The component support member holds predetermined components of the pipe and filtration system having a predetermined centerline at the same vertical distance from the cross bar, thereby maintaining the same centerline for all pipe system components supported by the skid regardless of component diameter.

28 Claims, 12 Drawing Sheets

(51) Int. Cl.
  *F16L 3/22* (2006.01)
  *F16L 3/08* (2006.01)
  *B01D 29/15* (2006.01)
  *B01D 29/52* (2006.01)

(56) References Cited

U.S. PATENT DOCUMENTS

| | | | |
|---|---|---|---|
| 1,698,974 A | 1/1929 | Vance | |
| 2,673,700 A * | 3/1954 | Eberhardt | 108/53.5 |
| 2,756,369 A * | 7/1956 | Gorrie | 361/826 |
| 3,071,205 A * | 1/1963 | Beck, Jr. | 182/146 |
| 3,164,255 A | 1/1965 | Jay | |
| 3,498,654 A * | 3/1970 | Diaz et al. | 52/653.2 |
| 3,903,671 A * | 9/1975 | Cuin et al. | 52/480 |
| 4,128,219 A * | 12/1978 | Kaigler et al. | 248/55 |
| 4,830,144 A * | 5/1989 | Werner | 182/178.5 |
| 4,957,251 A * | 9/1990 | Hubbard | 248/68.1 |
| 5,050,824 A * | 9/1991 | Hubbard | 248/57 |
| 5,110,073 A * | 5/1992 | Schoenky | 248/49 |
| 5,163,642 A * | 11/1992 | Torrens et al. | 248/49 |
| 5,217,191 A * | 6/1993 | Smith | 248/55 |
| 5,593,115 A * | 1/1997 | Lewis | 248/68.1 |
| 5,788,192 A * | 8/1998 | Poole, Jr. | 248/49 |
| 5,829,718 A * | 11/1998 | Smith | 248/55 |
| 5,855,342 A * | 1/1999 | Hawkins et al. | 248/68.1 |
| D406,476 S * | 3/1999 | Boije | D6/574 |
| 6,061,984 A | 5/2000 | Rose | |
| 6,402,096 B1* | 6/2002 | Ismert et al. | 248/68.1 |
| 6,457,787 B1* | 10/2002 | Chicoyne | 312/265.4 |
| 6,554,102 B2* | 4/2003 | Schworer | 182/179.1 |
| 6,572,057 B1* | 6/2003 | Roth | 248/58 |
| 6,708,937 B2* | 3/2004 | Thurman | 248/201 |
| 6,742,746 B1* | 6/2004 | La Scola et al. | 248/49 |
| 6,839,996 B2* | 1/2005 | Kim | 40/607.14 |
| 7,490,600 B2* | 2/2009 | Kopp | 126/82 |
| 7,498,511 B1* | 3/2009 | Brown | 174/40 R |
| 7,832,692 B1* | 11/2010 | Russell | 248/55 |
| 8,141,826 B1* | 3/2012 | Gallardo et al. | 248/74.4 |
| 8,226,052 B1* | 7/2012 | Hancock | 248/74.4 |
| 8,434,629 B2* | 5/2013 | Fernandez | 211/94.01 |
| 8,534,625 B2* | 9/2013 | Heath et al. | 248/226.11 |
| 8,646,624 B2* | 2/2014 | Fernandez et al. | 211/90.02 |
| 8,800,938 B2* | 8/2014 | Heath | 248/68.1 |
| 8,894,022 B2* | 11/2014 | Chirpich et al. | 248/74.3 |
| 9,038,968 B2* | 5/2015 | Hennon | 248/73 |
| 2003/0178253 A1* | 9/2003 | Tatge et al. | 182/132 |
| 2013/0105639 A1* | 5/2013 | Chirpich et al. | 248/73 |
| 2014/0202795 A1* | 7/2014 | Simmons et al. | 182/129 |

* cited by examiner

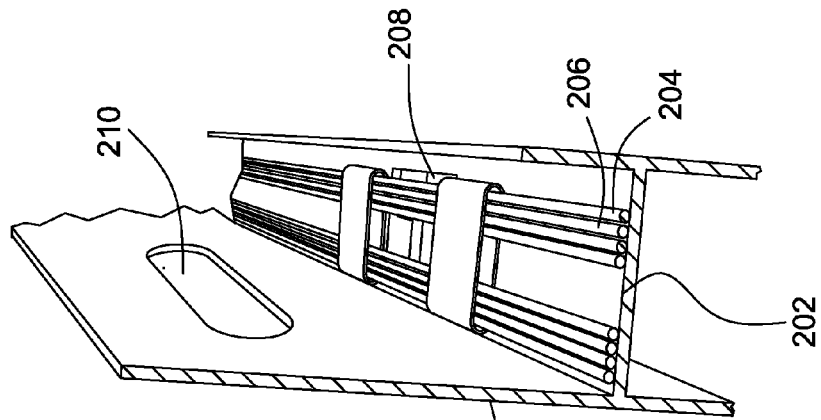
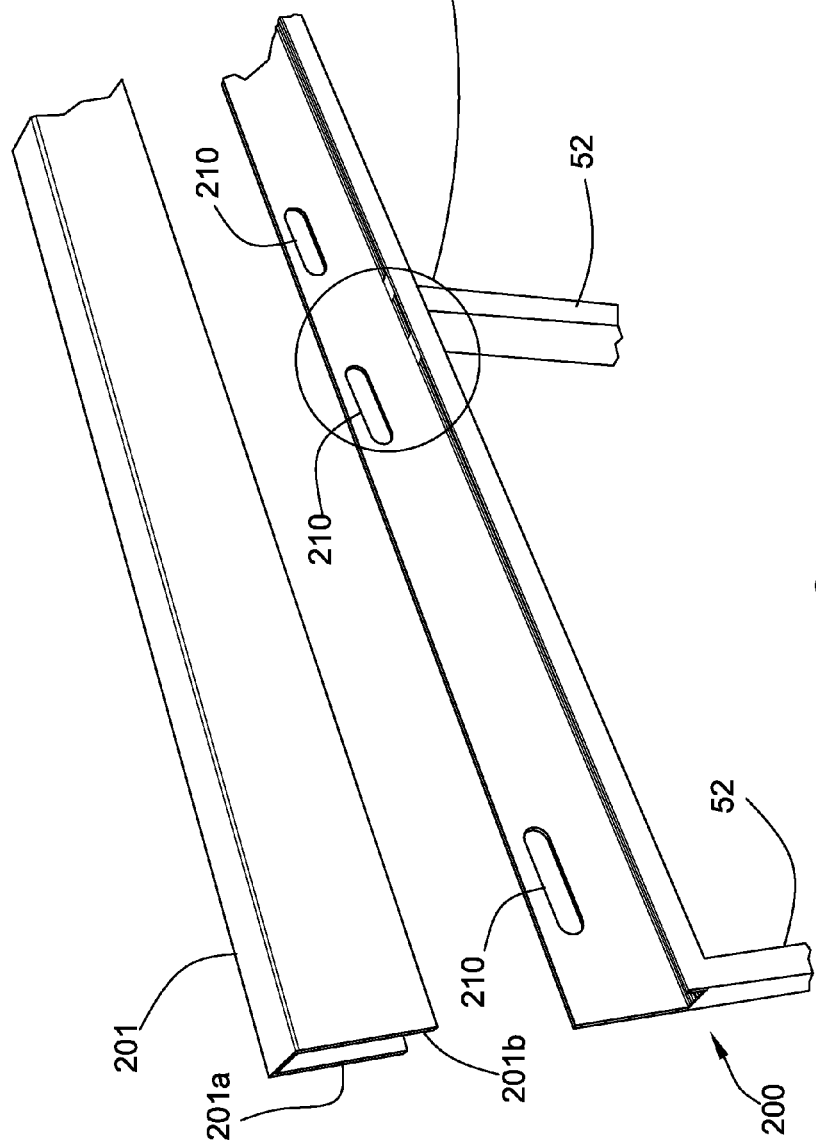
FIG. 5
FIG. 6

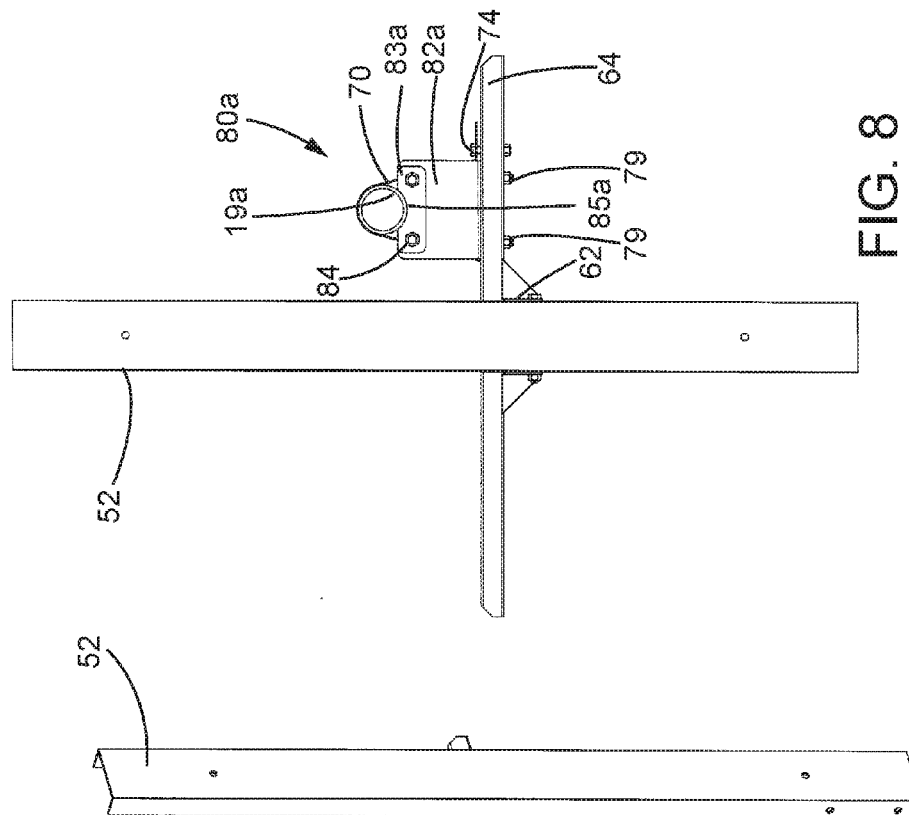
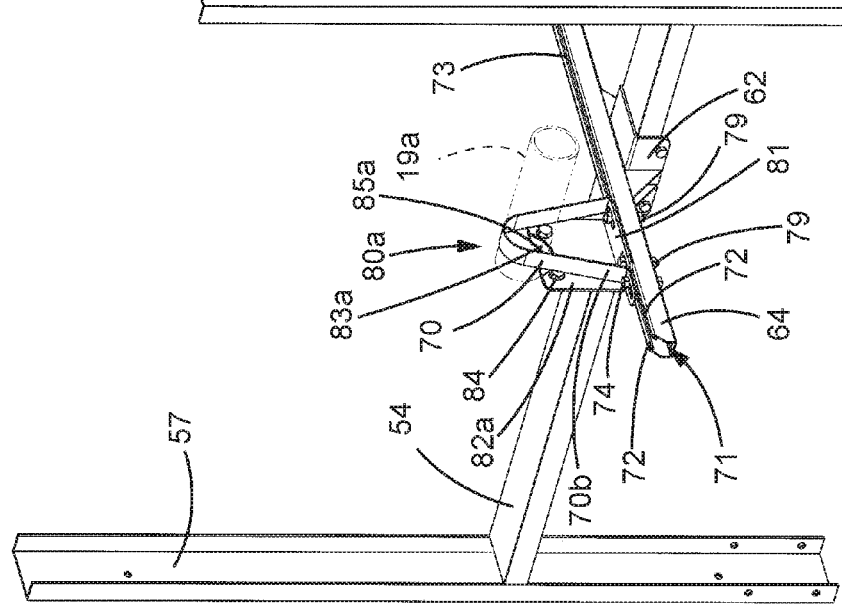
FIG. 8
FIG. 7

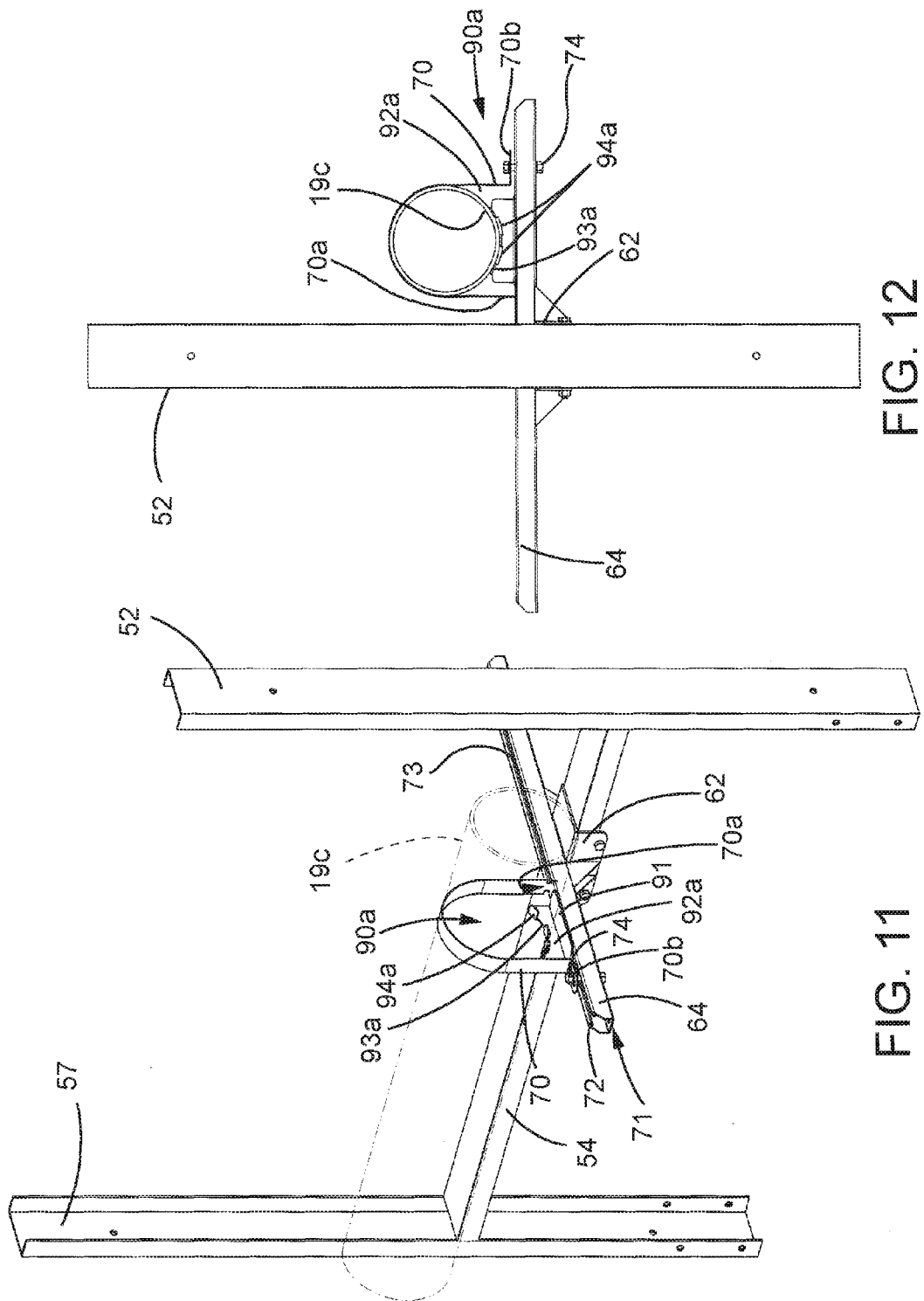

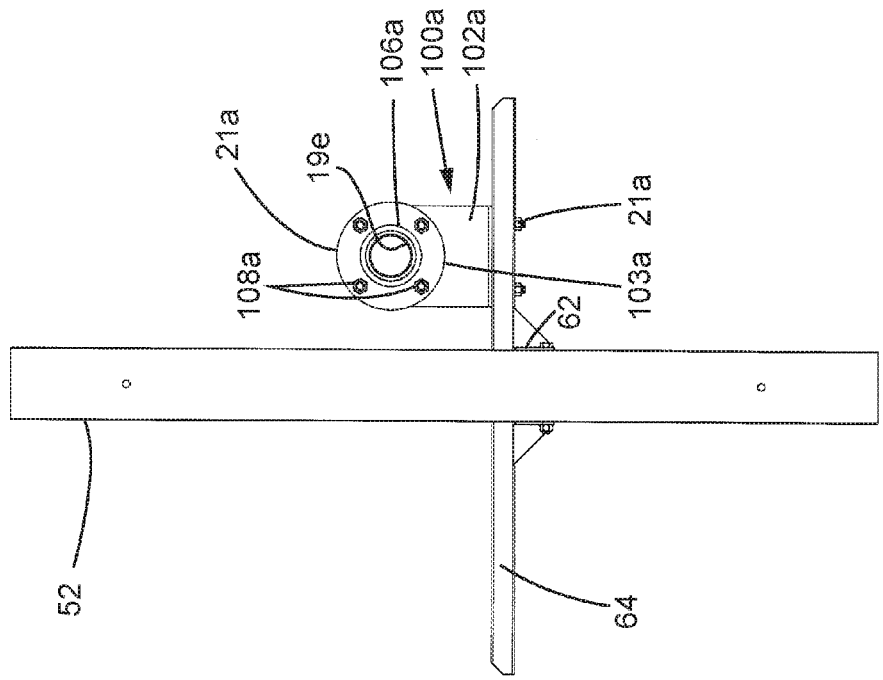
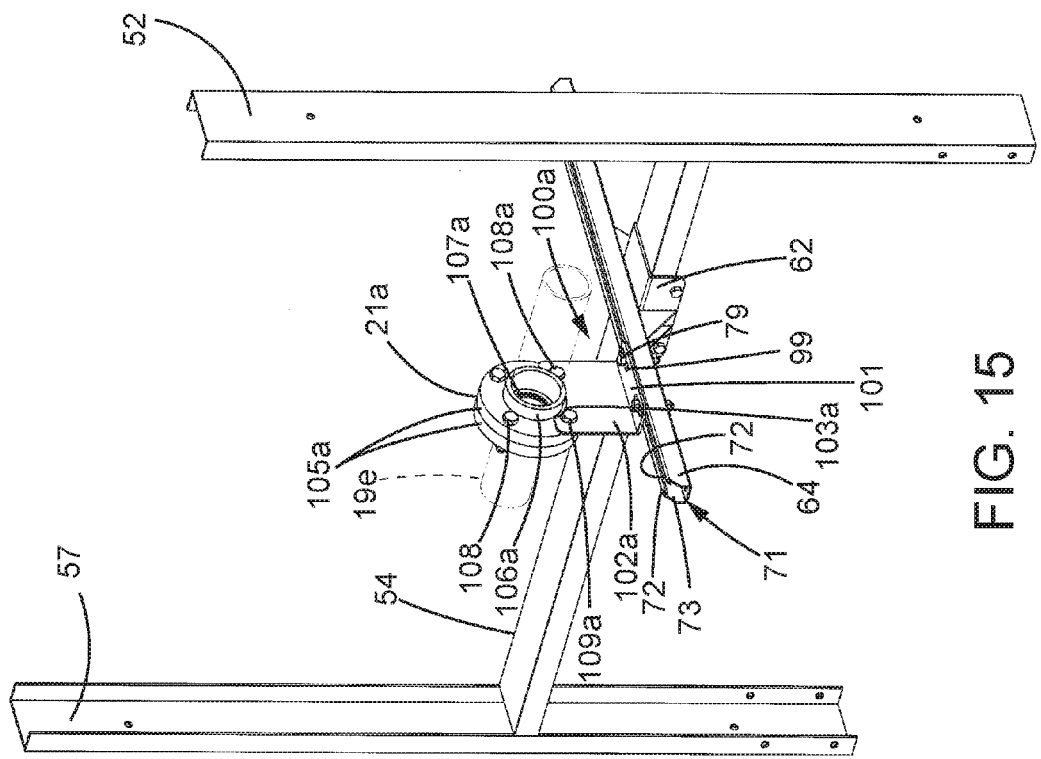
FIG. 15
FIG. 16

MODULAR FILTRATION FRAME ASSEMBLY

TECHNICAL FIELD

This invention relates to a modular filtration assembly and, more particularly, to a frame assembly for fluid filtrations systems.

BACKGROUND

Many filtration systems have a plurality of large filters for filtering undesirable substances, which can include solid or colloidal particulates, gels, and gas bubbles, from fluid and gas streams. These filtration systems have large, complex and robust pipe systems, including different-sized pumps, strainers, tubes and pipes of various diameters, control valves, and other components, which control the flow of the contaminated streams to the filters and clean effluent from the filters. Due to the system's flow rates and pressures, the system also requires pneumatic and electronic control and monitoring devices, wiring, lines, and systems.

Construction of a rigid skidded frame for supporting the robust, heavy pipe systems and filters in a pre-fabricated package delivered to the customer typically requires a custom-made frame, which has been expensive and difficult to design and build. Custom-made frames have been specially designed and built for each particular filtration system and pipe system configuration/flow capacity, and are not conducive to filter or pipe system modifications or redesign in response to future filtration system changes or customer-specific requirements not already included in the design. A frame could not be disassembled and used for another pipe or filtration system. Attaching the numerous different-sized components of the pipe system to the custom-made frame has also been time consuming, difficult and expensive. Access to system components for repairs has sometimes also been difficult and expensive.

SUMMARY OF THE INVENTION

In accordance with the present invention, a modular filtration frame assembly is provided for holding components of a pipe and filtration process system. The modular frame assembly comprises a skid formed by a base and a central spine. The base has at least two stabilizing (horizontal) legs and at least one lateral support disposed between the two horizontal legs, and the central spine has two uprights and at least one cross bar disposed between the two uprights. Component members are attached to the central spine as needed for supporting components of the pipe system. The skids with special configuration for holding tall assemblies like the filter elements or the control valve collection are called racks.

In one embodiment, the component support member comprises a hanger for engaging and holding the pipe system component. The hanger comprises a support bracket attached to the cross bar, and a lateral arm or strut attached to the support bracket which projects outwardly from the central spine to engage and support the pipe system component. More preferably, a pipe saddle or flange bolt bracket is attached to the lateral arm for holding a pipe system component. The saddles and flange bolt brackets have a predetermined shape to receive and hold a pipe or flange of a predetermined diameter and preferably maintain the centerline of that pipe or flange at a uniform distance from the lateral arm. In other embodiments, the saddle has a predetermined cross section to receive and hold a predetermined valve, or other components of the pipe system.

In a preferred embodiment, the saddle has a bottom end, and the lateral arm has a channel for slidably receiving the bottom end of the saddle so that the saddle can be adjustably mounted along the lateral arm and positioned in response to the location of the pipe system component. The saddle has a strap for securely holding a pipe system component to the saddle. The strap has first and second ends so that the first end is attached to the lateral arm and the second end is attached to the lateral arm after the pipe system component is positioned in the saddle.

The modular frame assembly preferably has a cross bar that that is securely attached to the uprights, by welding or other means, at a predetermined height which is determined in response to the location of the pipe system components. In other embodiments, the cross bar is adjustably attached to the uprights so that the height of the cross bar can be adjusted in response to the location of the pipe system components. More particularly, the uprights have an interior wall, and the interior wall may have a plurality of holes or other system which permit attachment of the cross bar so that the height of the cross bar can be adjusted in response to the location of the pipe system components.

In accordance with the invention, a method is provided for assembling a modular filtration assembly for holding components of a pipe system. The method comprises providing a predetermined and presized set of base legs, lateral base leg supports, vertical uprights, cross bars, and component supports. A base is formed by selecting two or more legs and at least one lateral leg support in response to the load of the pipe system, and attaching the legs and lateral leg supports together. A central spine is formed by selecting at least two uprights in, and at least one cross bar from the predetermined set of uprights and cross bars, and attaching the uprights and cross bar together. An equipment skid is then formed by attaching bottom ends of the uprights to the base legs. The method also includes selecting at least one component support in response to the component of the pipe system which needs to be supported, and attaching the component support to the central spine. In the preferred embodiment, the top of the vertical uprights forming the spine are at the same uniform elevation from one equipment frame to the next.

The method for assembling a modular filtration assembly further includes forming the central spine by positioning a height of the cross bar in response to the height of the pipe system component or to a standard distance from the pipe centerline. The step of attaching the component support to the central spine includes sliding a support bracket of the component support along the cross bar into a position determined by the location of the pipe system component, and securing the component support by connecting the support bracket to the cross bar.

BRIEF DESCRIPTION OF THE DRAWINGS

The preferred embodiments of the present invention are explained in greater detail with reference to the following drawings. While various illustrative embodiments of the present invention are shown in the following drawings, the drawings should not be used to limit the scope of the present invention.

FIGS. 5-6 are perspective views of a raceway for holding and organizing electronic and pneumatic wires and tubes.

FIGS. 7-8 are a perspective view and a side elevational view, respectively, of a second embodiment of component support member for holding a pipe or similar pipe system component.

FIGS. 11-12 are a perspective view and a side elevational view, respectively, of a third embodiment of component support member for holding a pipe or similar pipe system component.

FIGS. 15-16 are a perspective view and a side elevational view, respectively, of a fourth embodiment of component support member for holding a flange bolt bracket or similar pipe system component.

DETAILED DESCRIPTION OF PREFERRED EMBODIMENTS

It will be appreciated that this detailed description provides exemplary embodiments of the invention. Since other embodiments of the invention can differ in detail from the embodiments in this detailed description, the detailed description is intended to reference the particular embodiments being discussed at that point and is not intended to imply any limitation as to the scope of the invention more generally.

Figure 1:
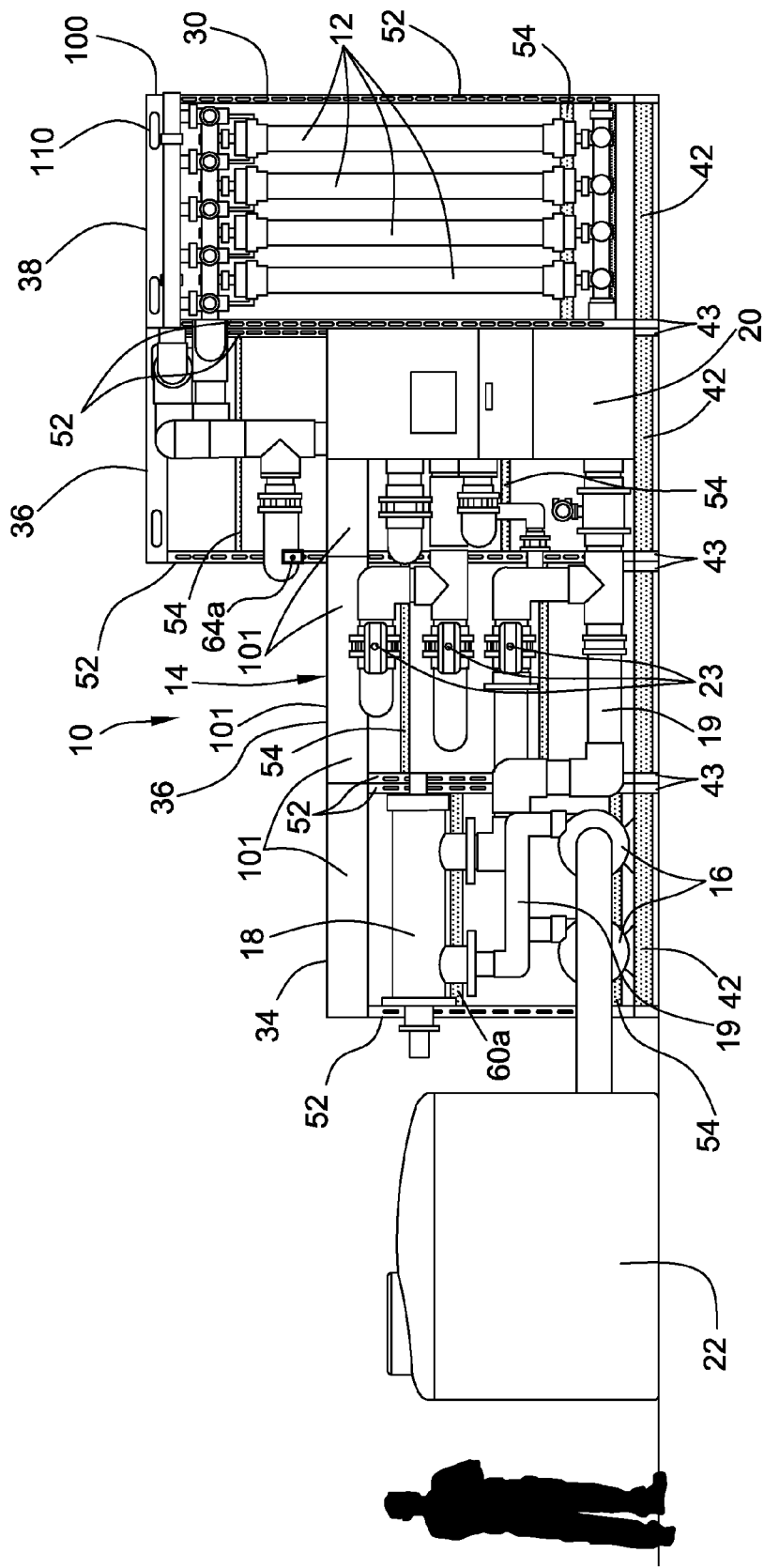
FIG. 1 is a front elevational view of one embodiment of a modular filtration assembly showing a modular frame system made in accordance with the invention, which is holding a plurality of filters and a pipe system which delivers liquid and gas streams to and from the filters.

FIG. 1 illustrates an exemplary filtration system 10 which has a plurality of filters 12, and a pipe system 14 which delivers a contaminated liquid stream, which can contain undesirable substances such as solid or colloidal particulates, to the filters 12 and delivers clean effluent from the filters 12. The filtration system 10 and pipe system 14 can have any number of configurations and components and is merely presented to illustrate how one embodiment of a modular filtration frame assembly 30 in accordance with the invention would interact with the filtration system 10 and pipe system 14. For clarity, certain horizontal crossbars and bases of the frame assembly 30 have been shaded in FIG. 1.

The pipe system 14 comprises a series of components such as pumps 16, strainers 18, pipes 19, pipe brackets 21, tubes, valves 23, control and monitor devices, and the like. A human machine interface 20 is operatively connected to the filtration system 10 so that it can monitor the filtration system 10 and control the flow through the pipe system 14 and filters 12. A feed tank 22 or other supply source stores the contaminated liquid. After the filters 12 remove the undesirable substances from the stream, the clean effluent is used in downstream processing or stored (in other tank or vessel not shown) for later end use.

A modular filtration frame assembly 30 in accordance with the invention is also shown in FIG. 1. The modular frame assembly 30 has one or more modular load-bearing skids 40 which support and hold the pipe system 14 and/or the filters 12. In the embodiment illustrated in FIG. 1, the frame assembly 30 includes a pump/strainer skid 34 for supporting the pump 16, strainer 18, and associated pipes 19, two valve racks 36 for supporting the valves 21 and associated pipes 19, and a filter rack 38 for supporting the filters 12, and related pipe components. The skids 40 with special configuration for holding tall assemblies like the filters or the control valve collection are sometimes called racks.

Figure 2:
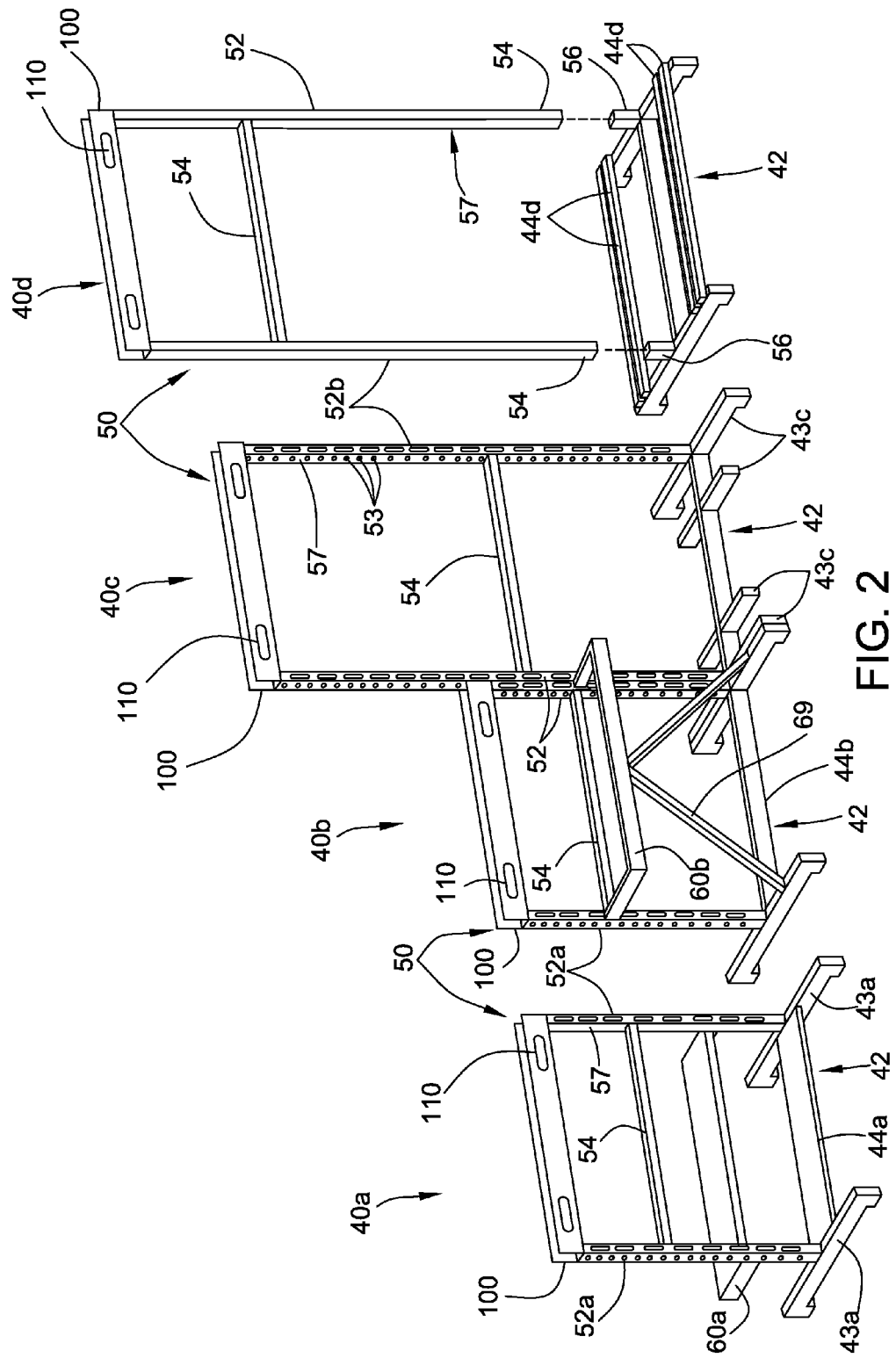
FIG. 2 is a perspective view of embodiments of the modular frame system.

It will be appreciated that the modular skids 40 can be varied to accommodate variations and differences in filtration and pipe systems. FIG. 2 shows different embodiments of the modular skids 40a, 40b, 40c, 40d. Each skid 40 has a base 42 and a central spine 50. In some cases, the central spine is located off-center from the middle of the base. The central spine 50 is formed by at least one vertical support or upright 52 and cross bar 54, and preferably two uprights 52 and at least one horizontal cross bar 54. As generally shown in FIG. 2, aligning the central spines 50 of two or more adjacent skids 40 will also align the axis of the skids 40, and will assist in constructing and orienting the frame assembly 30. Two or more of the modular skids 40 can be positioned to accommodate different filtration systems 10 and pipe systems 14. For example, two adjacent skids 40 can be positioned next to each other so they are touching as shown by skids 40b and 40c, or they can be spaced apart, as shown by skids 40a and 40b, and skids 40c and 40d. In response to the specific layout required by other filter and pipe systems, the central spines 50 of two or more skids 40 can be parallel to each, or perpendicular to each other, or disposed in an angular relationship to each other. In FIG. 1, for example, the central spines 50 of two skids 34, and three racks 36, 38 have been aligned in a single row. In other embodiments, the skids 40 can be aligned to make an L-shaped, T-shaped, or other configuration.

In accordance with the invention, the center spine 50 provides structural support to the components of the pipe system 14 either wholly or as supplemented by other uprights or outriggers 72 that may be added for extra strength. It also permits full access to both sides of the assembled pipe system 14 so the pipe system 14 can be monitored and serviced.

Each base 42 has at least one leg 43, and preferably two legs 43 and a lateral leg support 44 disposed between the legs 43. The modular skid 40 permits the number, size and location of the legs 43 and lateral leg supports 44 to be varied in response to the size of the system and weight of the components of the pipe systems 14. The modular configuration of the skid 40 can be designed and then assembled by selecting from a set of predetermined and pre-sized base designs. In the illustrated embodiments, for example, the skid 40 was configured so that skid 40a has two legs 43a and skid 40c has four legs 43c. The illustrated set of legs 43 has two lengths but additional predetermined styles, lengths and widths can be part of the predetermined set. Skid 40a has a relatively wide lateral leg support 44a, whereas skid 40b has a narrower lateral leg support 44b, and skid 40d has five narrow lateral leg supports

44d. The illustrated set of lateral leg supports has three widths, but other predetermined sets can have other styles, lengths and widths.

The modular frame is configured to a number of specific standard heights that will then provide all needed support locations for various configurations of piping and equipment included in different skid designs. The predetermined height of the frame is selected to accommodate the size of the filtration system and pipe system. The modular configuration of the rack 40 can be designed and then assembled by selecting from a set of predetermined and pre-sized set of uprights 52. FIGS. 1 and 2 illustrate embodiments which have two pre-sized uprights 52a and 52b with two preselected heights, but other embodiments can have additional preselected heights. In a preferred embodiment, the top of the vertical uprights 52 forming the spine 50 are at the same uniform elevation from one equipment frame to the next. To accommodate uprights 52 having different heights, the bottom of a upright 52 can have a hollow female member 54 which mates with a male member 56 on the top of the base 42, as shown in FIG. 2. The female and male members 54, 56 can be further attached to each other using screws, bolts and the like. It will be appreciated that welding or other permanent attachment means can be used to secure the uprights 52 to the base.

While the modular frame permits the height of the uprights 52 to be varied to accommodate the height of the components in the pipe system 14, the height of the uprights 52 and the skid 40 preferably will be one of two heights as shown in FIG. 2 to enhance the modularity of the frame assembly 30. In other embodiments, the uprights 52 can also be attached to the base 42 by welding the bottom of the upright 52 to the base 42. The upright can have any suitable configuration. In FIG. 2, for example, the uprights have a tubular rectangular configuration. In FIGS. 7-16, the uprights have a U-shaped channel configuration.

Figure 3:
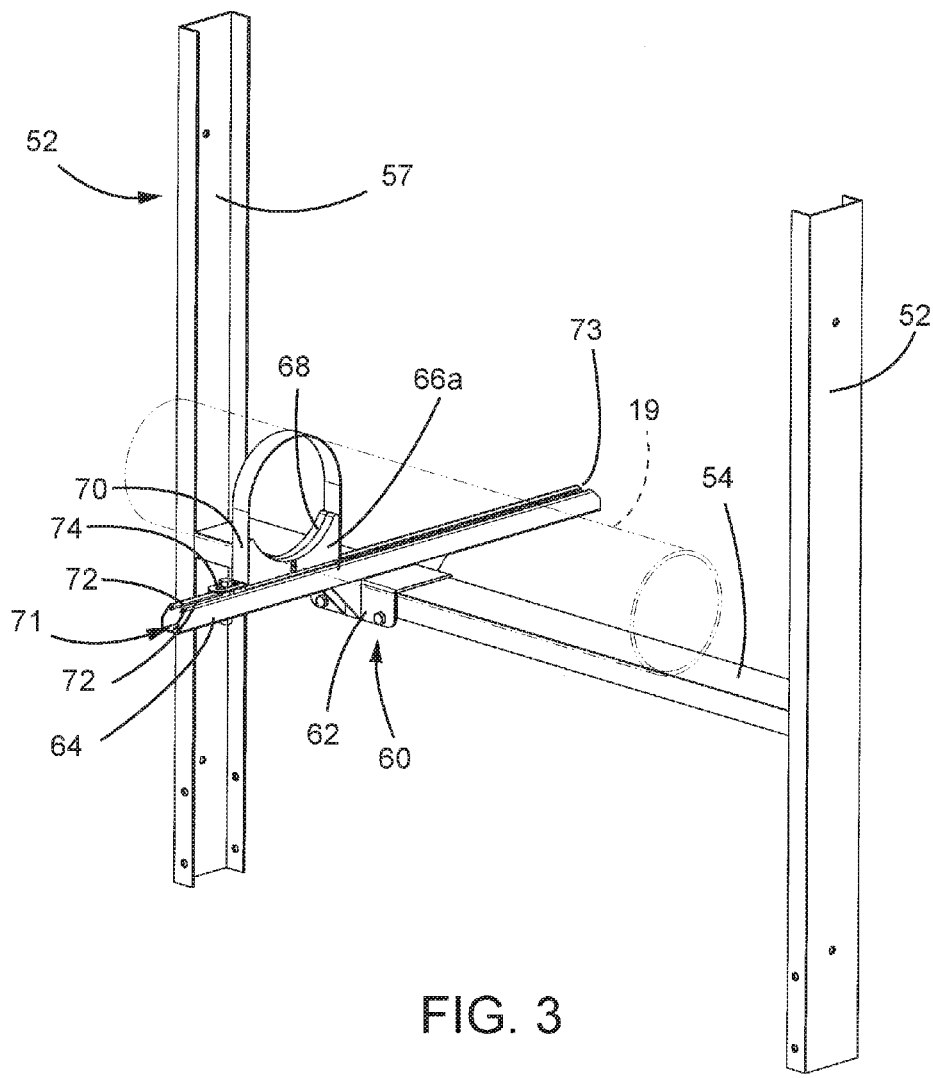
FIG. 3 is a perspective view of a central spine, and an embodiment of a component support member for holding components of the pipe system, which has an adjustable hanger mounted on a cross bar.

In a preferred embodiment shown in the skids 40a and 40d in FIG. 2 and FIG. 3 and the uprights in FIGS. 7-18, the cross bar 54 can be welded to the interior side 57 of the uprights 52. In another embodiment shown in skids 40b and 40 in FIG. 2 and in FIGS. 19-20, the cross bar 54 can be releasably attached to the uprights 52 to enhance the modularity of the skid 40 which permits pre-sized and prefabricated parts to be shipped and later assembled at the site of the filtration system. In FIG. 2, for example, the uprights 52 in skids 40b and 40c have a plurality of holes 53 on the interior side 57 of the uprights 52 which permits the height of the cross bar 54 to be varied in response to the location and height of the pipe system components. The cross bar 54 can be releasably attached to the uprights 52 using bolts, screws, and other similar fasteners.

Each skid 40 also has at least one component support member which is adapted to releasably engage and hold the pipes 19, pipe brackets 21, valves, pumps 16, strainers 18, sensors, and other components of the pipe system 14. The modular configuration of the component support member can be designed and then assembled by selecting from a set of predetermined and pre-sized component support members such as hangers 60 and 109, shelves 60a, tubular platforms 60b, pipe saddles 66, 80, and 90, and flange bolt brackets 100, and the like. Two embodiments of a component support member are a shelf 60a (attached to skid 40a in FIG. 2 and skid 34 in FIG. 1), and tubular platform 60b (attached to skid 40b in FIG. 2) which can be used to hold larger components such as strainers 18 and pumps 16. Depending on the weight of the pipe system 14, an outrigger 69 or other support can be attached between the component support member and base 42.

The component support members can be attached to a cross bar 54 disposed between two uprights 52 as shown in FIGS. 3-4, 7-18, or directly attached to the uprights 52 as shown in FIGS. 2, 4, and 19-20. In a preferred embodiment shown in FIG. 3, the support member comprises a modular hanger 60 which has a support bracket 62 which slidably engages the cross bar 54 so that the position of the hanger 60 can be slidably adjusted along the cross bar 54 in response to different pipe systems. Once the desired position is attained, the channel-like bracket 62 can be releasably connected to the cross bar 54 using screws, bolts, welds, and the like. It will be appreciated that the modular frame assembly permits the number and location of hangers 60 to be varied in response to system requirements during assembly. The hanger 60 has a lateral arm or strut 64 attached to the support bracket 62, which projects outwardly from the cross bar 54 and upright leg 52 so that it can engage and hold components of the pipe system.

To enhance the modularity and flexibility of the frame assembly 30, the component support member comprises different predetermined and presized saddles and flange bolt brackets which are selected and then attached to the hanger 60 to accommodate different-sized pipes 19, pipe flanges 21, valves, and other components of the pipe system.

In accordance with the invention, a saddle 66, 80, and 90 is adapted to engage and releasably hold pipe system components which have a cylindrical shape such as pipes 19. In one embodiment of a saddle 66 shown in FIG. 3, the saddle 66 has a bottom end which is adapted to slidably engage a channel 71 in the lateral arm or strut 64 so that its position can be adjusted along the arm 64 in response to location of the pipe system components. In the illustrated embodiment, the channel 71 has two upper shoulders 72 which project inwardly towards each other and form a slot 73. In one embodiment, the saddle 66 has a narrow cross-section sized to slide in the slot 73 and a relatively wide bottom end which fits within the channel 71 but is too wide to fit through the slot 73. The saddle 66 is fixed to the strut 64 in its desired location using bolts, screws, welds, and the like.

Figure 4:
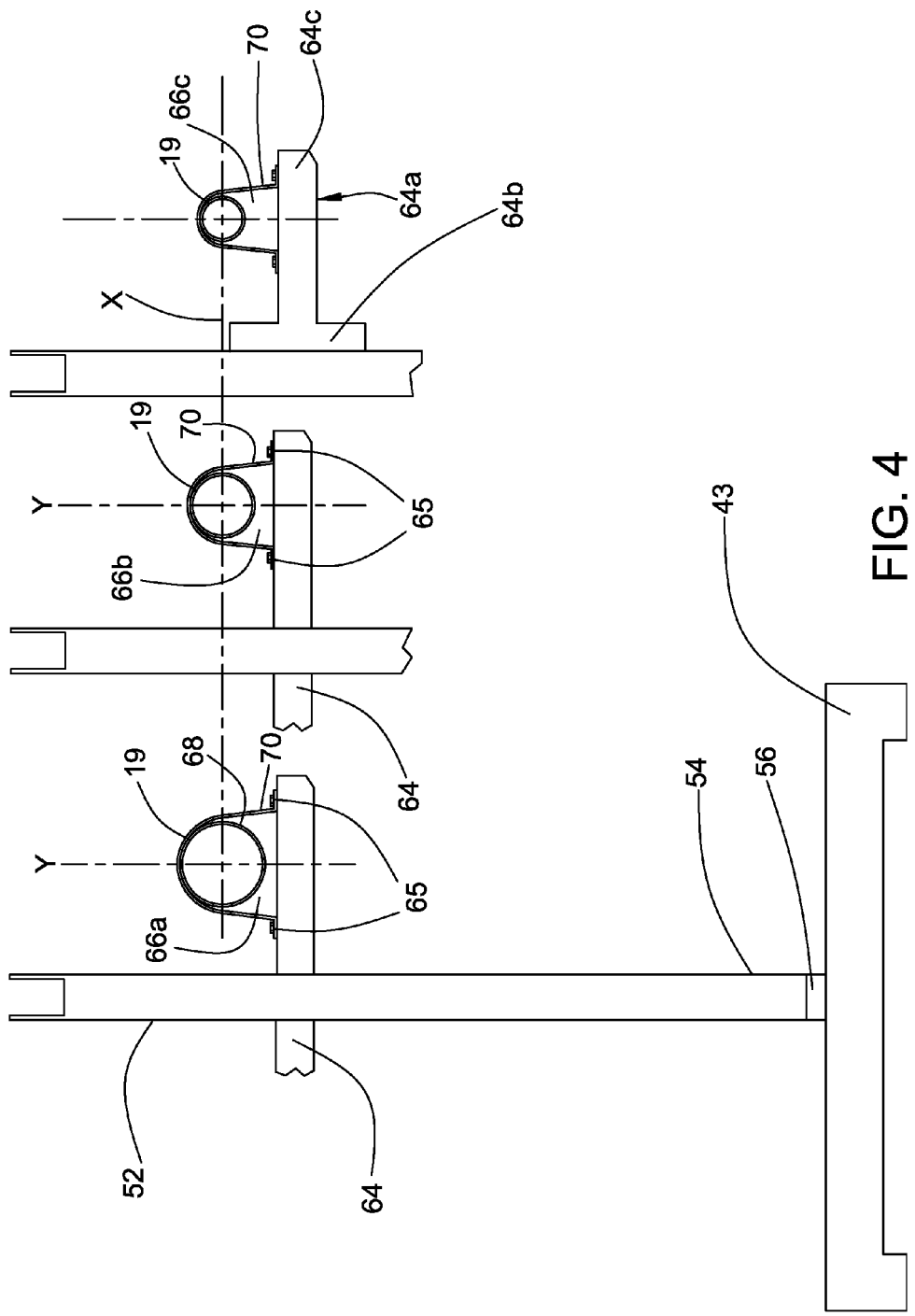
FIG. 4 is a side elevational view of a frame having three hangers supporting three different-sized pipes at the same vertical distance from the cross bar, thereby maintaining the same pipe centerline for a run of pipe supported from that cross bar, regardless of pipe diameter selected.

FIG. 3 illustrates one saddle 66 but, in other embodiments, two saddles 66 can be located on opposite sides of the skid center spine 50. Typical pipe diameters are eight, six, four, and three inches. Referring to the schematic illustration in FIG. 4, it will be appreciated that the modular frame system permits different saddles 66a, 66b, 66c to be attached to the arm 64 in response to different pipe diameters used in pipe systems. Typically, each saddle will correspond to a specific pipe diameter. In accordance with the invention, it will be appreciated that properly aligning the horizontal centerline X of different-sized pipes and other pipe system components at a predetermined vertical height and location is necessary to properly connect the numerous components of the pipe system 14 and filtration system 10 together. As schematically shown in FIG. 4, by properly selecting a corresponding saddle and pipe diameter, the same modular component support member can be used to align the horizontal centerline X of multiple pipes with different diameters at a desired centerline height and location. The component support members have a predetermine shape to receive and hold a pipe or pipe flange of a predetermined diameter while maintaining the horizontal centerline X of that pipe or flange at a uniform distance above the lateral arm (or other reference point such as the cross bar or floor). Similarly, since the saddle can be slidably positioned along the arm 64, the modular component member also permits control of the vertical centerline Y of pipes, pipe flanges, and other components of the pipe system 14 having different diameters relative to the skid centerline, upright or other reference point.

The saddle 66 has an arcuate edge or cross section 68 corresponding to outer diameter and shape of the pipe 19 for receiving and holding the pipe 19. A strap 70 wraps around the pipe 19 to releasably secure the pipe in the saddle 68. The ends of the strap 70 can be releasably attached to the saddle 68 or the lateral arm 64 using screws, nuts/bolts and the like. In the embodiment in FIG. 4, for example, both ends of the strap are releasably attached to the strut 64 using nuts and bolts 65. In the embodiment in FIG. 11, for example, one end 70a of the strap 70 is T-shaped so that the wide part may slidably engage the strut channel 71 but is too wide to fit through the narrower slot 73. The second end 70b of the strap 70 is adapted to be secured to the strut 64 using a nut and bolt 74. The strap 70 may be made of any suitable material such as metal, plastic polymers, and the like which is strong enough to resist forces exerted on it but flexible enough to wrap around the pipe 19.

Figure 10:
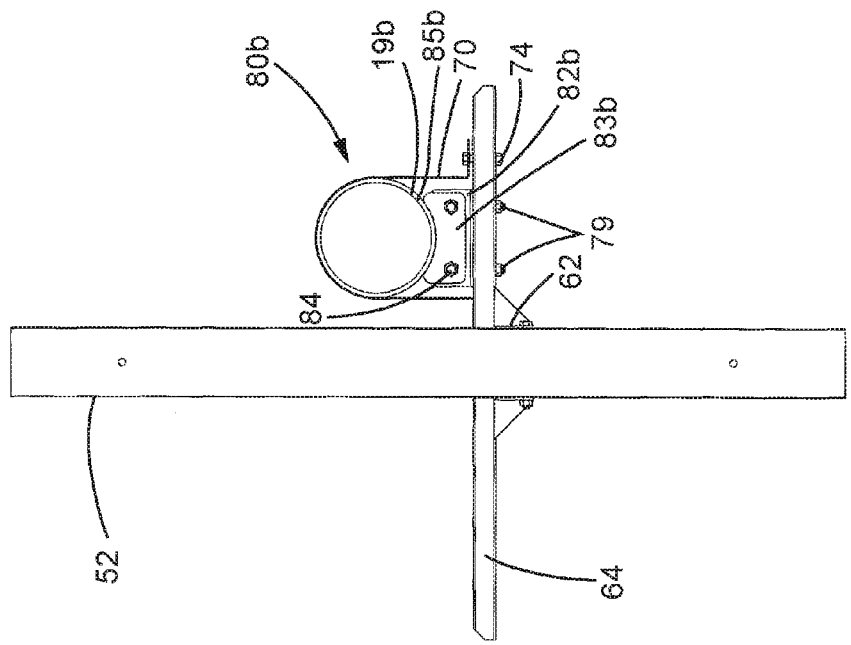
FIGS. 9-10 are a perspective view and a side elevational view, respectively, of the second embodiment of component support member except the pipe or other pipe system component has a larger diameter than the pipe shown in FIGS. 7-8.
Figure 9:
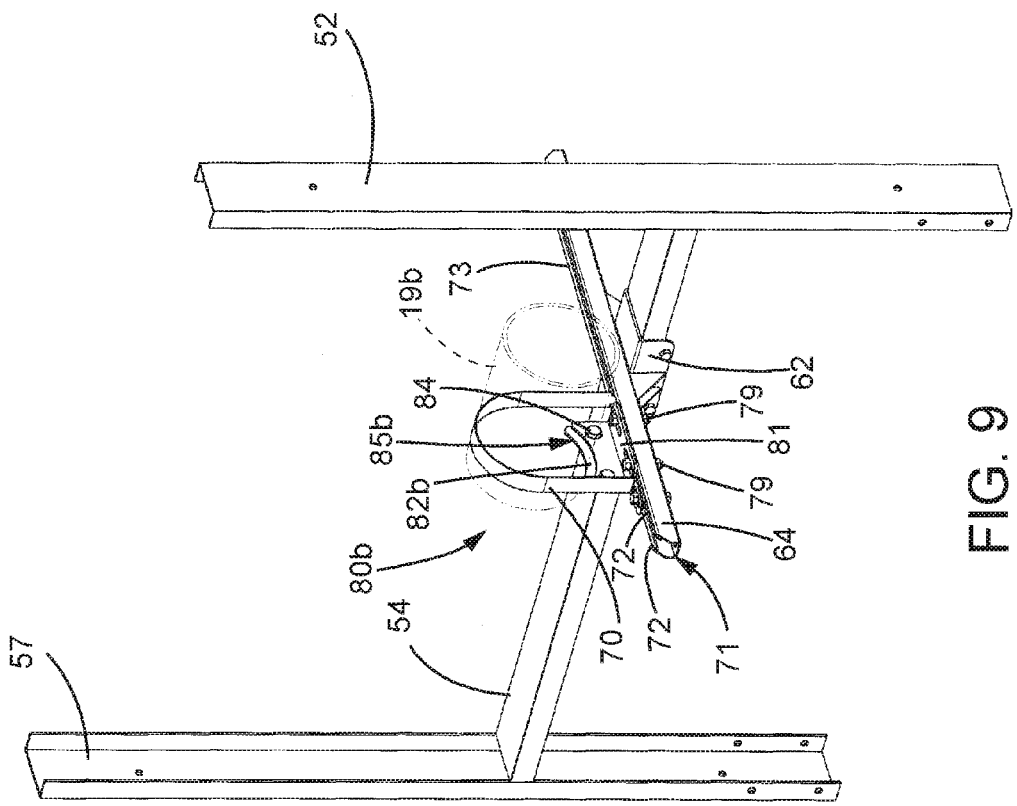

FIGS. 7-10 show another embodiment of the saddle 80. The saddle 80a in FIGS. 7-8 is configured to hold a smaller diameter pipe 19a such as, for example, a three-inch pipe, whereas the saddle 80b in FIGS. 9-10 is configured to hold a larger diameter pipe 19b such as, for example, an eight-inch pipe. In FIGS. 7-8, the saddle 80a has an L-shaped configuration forming a bottom member 81 and a side member 82a. A pipe spacer 83a is attached to the side member 82a using one or more bolts, screws and the like 84. The bottom member 81 has at least one hole for receiving nut/bolts 79, screws and the like to secure the saddle 80a to the strut 64. After the T-shaped bottom end of the strap 70 is slidably inserted into the channel 71, the bottom member 81 is placed the desired location on the strut 64, and secured to the strut 64. The pipe spacer 83a has an arcuate edge or cross section 84a corresponding to outer diameter and shape of the pipe 19 for receiving and holding the pipe 19. After the pipe 19a is placed in the arcuate edge 84a, the strap 70 is wrapped around the pipe 19a, and the second end 70b is secured to the strut 64 using bolt 74.

The saddle 80b in FIGS. 9-10 has the same elements as the saddle 80a in FIGS. 7-8, except the size and shape of the side member 82b, spacer 83b, and arcuate edge or cross section 85b are configured to receive and hold a larger diameter pipe 19b. The bottom members 81 are the same. In accordance with the invention, even though pipes 19a and 19b have different diameters, both saddles 80a and 80b will hold the centerlines of their respective pipes at the same distance above the strut 64 (or other reference point). In response to other pipes diameters, the side members, spacers and arcuate edges are configured and sized to maintain the same pipe centerline regardless of pipe diameter.

Figures 13, 14:
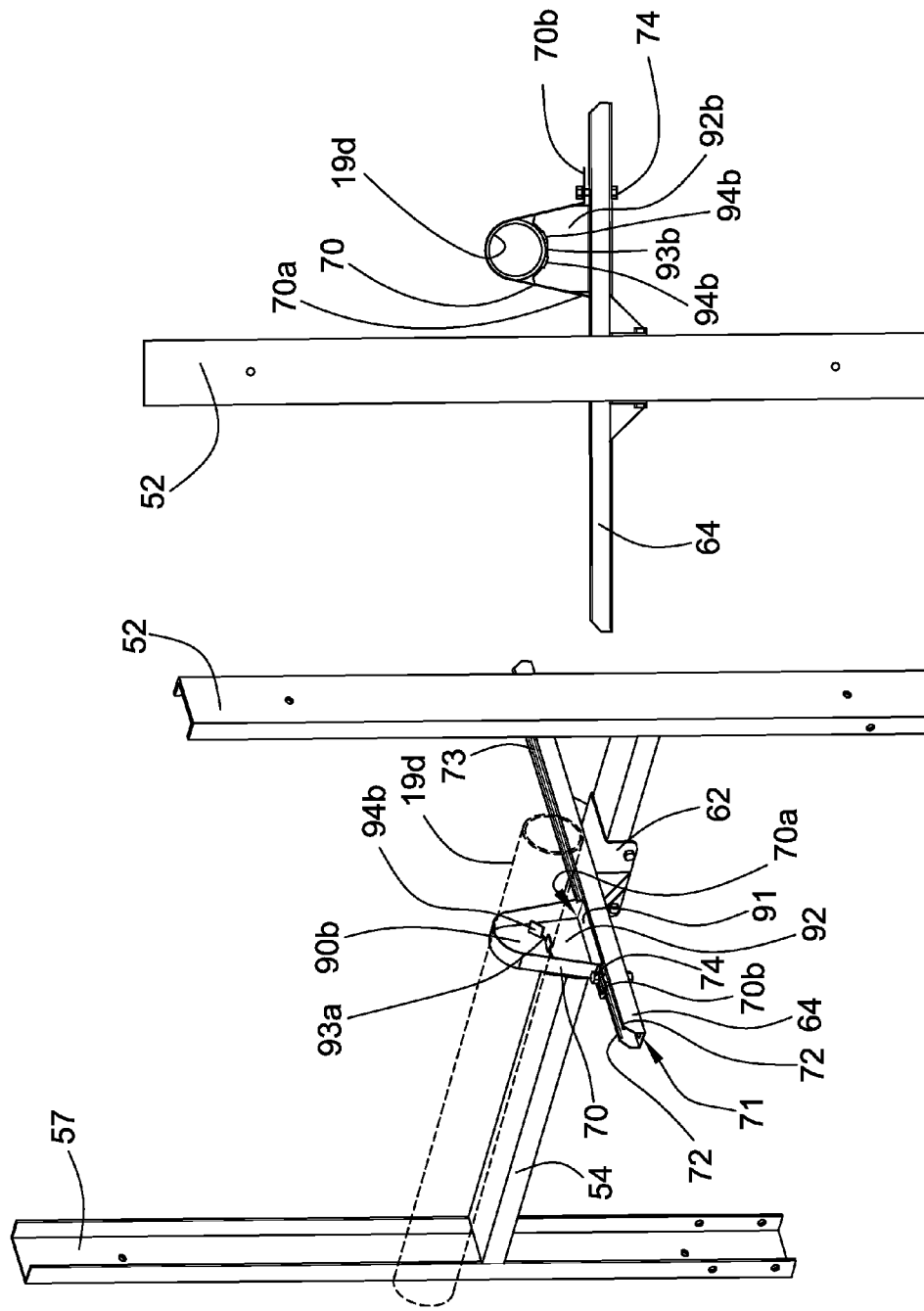
FIGS. 13-14 are a perspective view and a side elevational view, respectively, of the third embodiment of component support member except the pipe or other pipe system component has a smaller diameter than the pipe shown in FIGS. 11-12.

FIGS. 11-14 show yet another embodiment of the saddle 90 configured to hold a pipe 19. The saddle 90a in FIGS. 11-12 is configured to hold a larger diameter pipe 19c such as, for example, an eight-inch pipe, whereas the saddle 90b in FIGS. 13-14 is configured to hold a smaller diameter pipe 19d such as, for example, a four-inch pipe. Like the saddle 80 in the previous embodiment, this embodiment of the saddle 90a in FIGS. 11-12 has an L-shaped configuration forming a bottom member 91 and a side member 92a. After the T-shaped bottom end 70a of the strap 70 is slidably inserted into the channel 71, the bottom member 91, which also has a T-shaped edge, is slidably inserted into the channel 71. When the second end of the strap 70b is wrapped around the pipe and securely fastened to the strut 64 using a nut/bolt 74, the saddle 90a is also fixedly attached to the strut 64. In contrast to the pipe spacer 83a in saddle 80, the side member 92a forms an arcuate edge or cross section 93a and a plurality of flanges 94a corresponding to outer diameter and shape of the pipe 19c, thereby receiving and holding the pipe 19c.

The saddle 90b in FIGS. 13-14 has the same elements as the saddle 90a in FIGS. 11-12, except the size and shape of the side member 92b, arcuate edge or cross section 93b, and flanges 94b are configured to receive and hold a smaller diameter pipe 19d. In accordance with the invention, even though pipes 19c and 19d have different diameters, both saddles 90a and 90b will hold the centerlines of their respective pipes at the same distance above the strut 64 (or other reference point). In response to other pipes diameters, the side members 92, arcuate edges 93, and flanges 94 are configured and sized to maintain the same pipe centerline regardless of pipe diameter.

Figure 18:
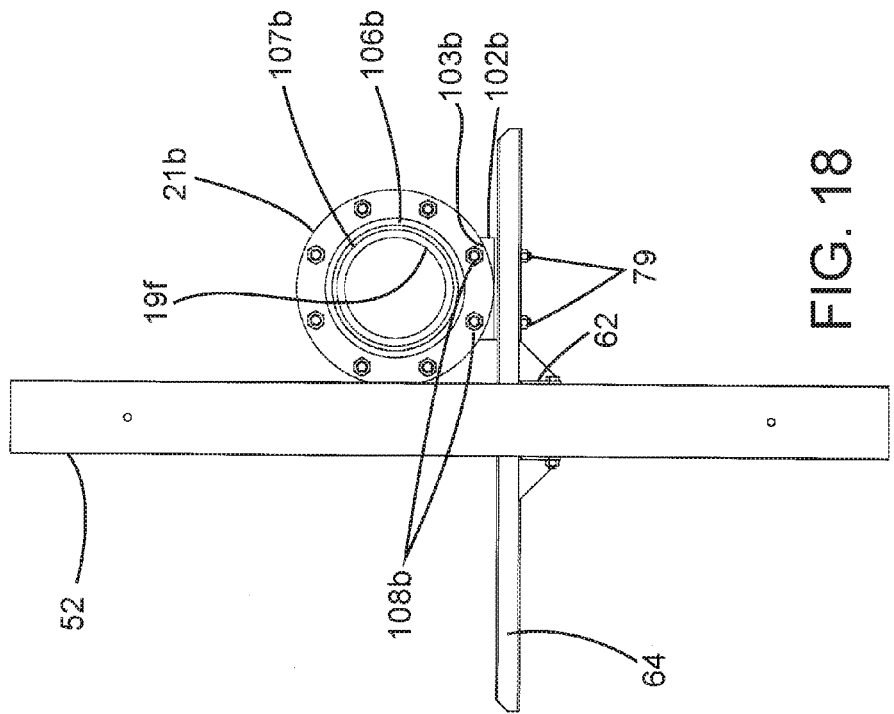
FIGS. 17-18 are a perspective view and a side elevational view, respectively, of the fourth embodiment of component support member except the flange bolt bracket or other pipe system component has a larger diameter than the pipe shown in FIGS. 11-12.
Figure 17:
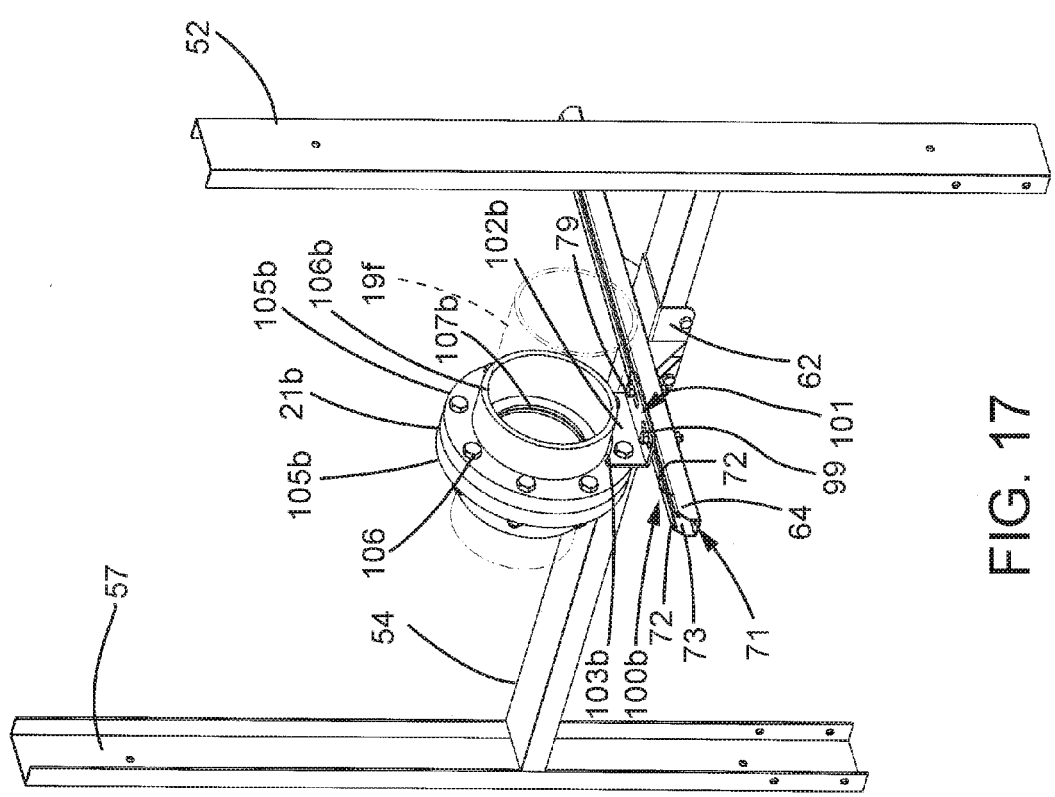

FIGS. 15-18 show an embodiment of a flange bolt bracket 100. The flange bolt bracket 100a in FIGS. 15-16 is configured to hold a smaller pipe bracket 21a such as, for example, a pipe bracket 21a which holds three-inch pipe. The flange bolt bracket 100b in FIGS. 17-18 is configured to hold a larger diameter flange bolt bracket 21b such as, for example, a pipe bracket 21b which holds an eight-inch pipe. Referring to FIGS. 15-16, the pipe bracket 21a has two side members 105a, wherein each side member 105a has a tubular wall 106a and hole 107a which receives the pipe 19e. A plurality of bolts 108 secure the two side members 105a together after the pipe 19e is inserted into the tubular wall 106a and hole 107a. The interior diameter of the tubular wall 106a is configured to receive the outer diameter of the pipe 19e.

The flange bolt bracket 100a has an L-shaped configuration forming a bottom member 101a and a side member 102a. The bottom member 101a has at least one slot 99 for receiving nut/bolts 79, screws and the like to secure the flange bolt bracket 100a to the strut 64. The side member 102a has an arcuate edge or cross section 103a corresponding to outer diameter and shape of the tubular wall 106 for receiving and holding the pipe bracket 21a. The side member 102a has a at least one bolt hole 109a, and preferably two holes 109a, for receiving bolts 108 from the pipe bracket 21a, thereby securing the pipe bracket 21a, pipe 19e to the strut 64.

The flange bolt bracket 100b in FIGS. 17-18 has the same elements as the flange bolt bracket 100a in FIGS. 7-8, except the size and shape of the side member 102b and arcuate edge 103b are configured to receive and hold a larger diameter tubular wall 106 b in a larger pipe bracket 21b. Similarly, the position of the bolt holes 109b in the side member 102b will vary in response the location of the bolts 108b in the pipe bracket 21b. The bottom members 101 are the same. In accordance with the invention, even though pipe brackets 21a and 21b have different diameters, both flange bolt brackets 100a and 100b will hold the centerlines of their respective pipes 19e at the same distance above the strut 64 (or other reference point). In response to other pipes and pipe brackets having different diameters, the side members 102, arcuate edges 103, bolt holes 109 can be configured and sized to maintain the same pipe centerline regardless of the diameter of the pipe 19e and pipe bracket 21.

Figure 20:
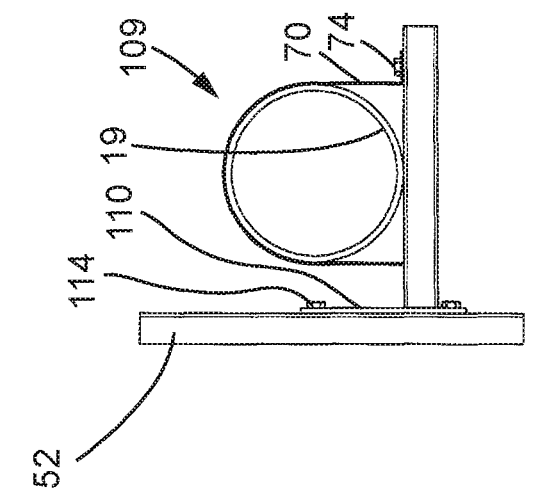
FIGS. 19-20 are a perspective view and a side elevational view, respectively, of a fifth embodiment of component support member.
Figure 19:
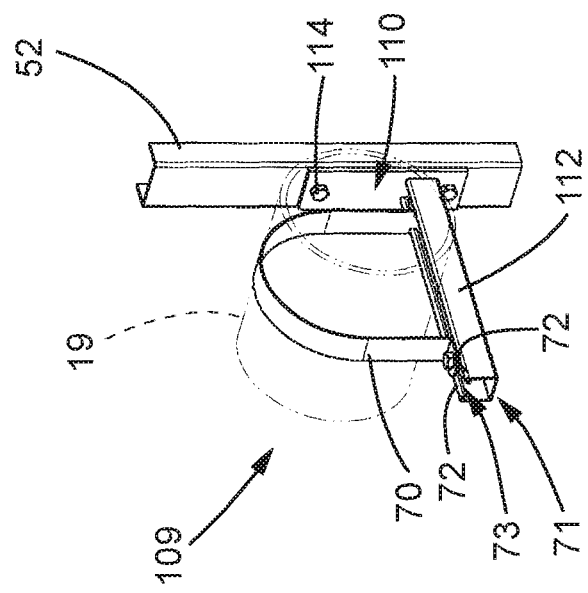

In another embodiment shown in FIGS. 19-20, the component support member is the hanger 160 which directly holds the pipe without a saddle or flange bolt bracket. The hanger comprises a first member 110 and a second member or strut 112 which form a generally T-configuration or L-configuration. The first member 110 forms a base which is attached to the upright 52 using nuts/bolts 114, screws, and the like. To increase vertical adjustability of the support member, the uprights can have a plurality of holes, as generally shown in skid 40a in FIG. 2, which are adapted to receive and hold the support 64*a*. The second member or strut 112 projects outwardly from the first member 110 and upright 52 so it can engage and hold a pipe component. In FIGS. 19-20, the pipe component is a pipe 19, which is support by the hanger. One end of the strap 70 is secured to the channel 71 so that the second end of the strap can wrap around the pipe 19 and be secured to the channel 71. To maintain the same pipe centerline for pipes with different diameters, the second member 112 can be attached to the first member at a higher or lower location, or the first member 110 can be attached to a higher or lower location on the upright 52.

It will be appreciated that, in accordance with the invention, a method is provided for assembly a modular frame assembly for holding different pipe sizes. After a single component support member such as the hanger 60 is attached to the skid, the frame assembly can be designed and then assembled by selecting from a set of predetermined and pre-sized saddles which are adapted to hold numerous pipe diameters.

It will be appreciated that the hanger 60 permits pipes, pipe brackets, tubes, valves of various diameters and sizes to be releasably and securely attached to the frame assembly without the fabrication of a custom support structure. The same modular frame can be shared for any filtration system or pipe system regardless of the diameter and size of the pipe system component. During construction of the pipe system, the modular frame assembly permits the size of the pipe and other components to be selected relatively late in the assembly process compared to custom-made frames. It also reduces the number of parts necessary to make the frame compared to custom-made frames.

To accommodate the numerous electrical lines, control lines, and pneumatic tubes and hoses which are used to power, control and monitor the filtration system and pipe system uses, the skid 40 has a raceway 200 located near the top of the central spine. Referring to FIGS. 5-6, the raceway 200 can be formed by a U-shaped or J-shaped channel or other similar construction which is adapted to receive the wires 204, pneumatic lines 206, and the like. The raceway 200 has a slot 208 disposed near the uprights 52 so that the wires 204 and tubes 206 can access the raceway 200. The skid 40 can have an integrated hook 210 formed by a slot in the frame wall so that a crane or forklift can lift and move the skid 40 during assembly and disassembly. A cover 201, which has walls 201*a*, 201*b* adapted to fit over the raceway 200, protects the wires and hoses.

This disclosure is intended to be illustrative and not exhaustive. The disclosure will suggest many variations and alternatives to one of ordinary skill in the art. All these variations and alternatives are intended to be included within the scope of the present invention and appended claims. Those familiar with the art can recognize other equivalents of the embodiments described herein which are intended to be included within the scope of the present invention and appended claims.

The invention claimed is:

1. A modular filtration frame assembly for holding components of a pipe system on a substantially horizontal surface, the pipe system having a first pipe system component having a first diameter and centerline, the modular frame assembly comprising:
   a first skid formed by a base and a central spine;
   the base having at least two legs and at least one lateral support disposed between the two legs wherein the two legs and lateral support engage the surface and are substantially parallel to the surface;
   the spine having two uprights extending upwardly in a substantially perpendicular direction from the base and at least one cross bar disposed between the two uprights;
   a first component support member attached to the spine for supporting the first pipe system component so that the centerline of the pipe system component is substantially parallel to the cross bar of the spine.

2. The modular frame assembly as set forth in claim 1 wherein the first component support member comprises a first hanger for engaging and holding the first pipe system component, wherein the first hanger comprises a support bracket attached to the cross bar, and a lateral arm attached to the support bracket which projects outwardly in a substantially perpendicular direction from the cross bar to engage the first pipe system component, and
   one of a first saddle and a first flange bracket attached to the lateral arm for holding the first pipe system component.

3. The modular frame assembly for holding components of a pipe system as set forth in claim 2, wherein the pipe system has a second pipe system component having a second diameter and centerline different from the first diameter and centerline of the first pipe system component, the modular frame assembly further comprising
   a second skid having a base and a central spine,
   the base of the second skid having at least two legs and at least one lateral support disposed between the two legs wherein the two legs and lateral support engage the surface and are substantially parallel to the surface;
   the spine of the second skid has two uprights extending upwardly in a substantially perpendicular direction from the base and at least one cross bar disposed between the two uprights; and wherein the central spines of the first and second skids are substantially parallel to each other; and wherein the spine of the second skid supports the second pipe system component so that the second centerline is substantially parallel to the cross bar of the second skid;
   a second hanger attached to the cross bar of the second skid for engaging and holding the second pipe system component, wherein the second hanger comprises a second support bracket attached to the cross bar, and a second lateral arm attached to the support bracket which projects outwardly in a substantially perpendicular direction from the cross bar to engage the second pipe system component, and
   one of a second saddle and a second flange bracket attached to the second lateral arm for holding the second pipe system component.

4. The modular frame assembly as set forth in claim 3 wherein the first saddle has a predetermined cross section to receive and hold the first pipe system component;
   and the second saddle has a predetermined cross section to receive and hold the second pipe system component, so that the first centerline and the second centerline are at the same vertical distance from the cross bar, thereby maintaining the same centerline for the first and second pipe system components supported by the first and second skid regardless of pipe diameter.

5. The modular frame assembly as set forth in claim 3 wherein the first flange bracket has a predetermined cross section to receive and hold a first pipe valve having a predetermined centerline, and the second flange bracket has a predetermined cross section to receive and hold a second pipe valve having a predetermined centerline, so that the centerlines of the first and second pipe valves are held at the same vertical distance from the cross bar, thereby maintaining the same centerline for all pipe system components supported by the skid regardless of component diameter.

6. The modular frame assembly as set forth in claim 3 wherein the saddle and the flange bracket have a bottom member, and the lateral arm has a channel for slidably receiving the bottom member of the saddle and flange bracket so that the saddle and flange bracket can be adjustably mounted along the lateral arm substantially perpendicular to the cross bar and positioned in response to the location of the pipe system component.

7. The modular frame assembly as set forth in claim 3 wherein the saddle has a strap for securely holding a pipe system component to the saddle, the strap has first and second ends, wherein the first end is attached to the lateral arm and the second end is attached to the lateral arm after the pipe system component is positioned in the saddle.

8. The modular frame assembly as set forth in claim 1 wherein the cross bar is adjustably attached to the uprights so that the height of the cross bar can be adjusted in response to the location of the pipe system components.

9. The modular frame assembly as set forth in claim 8 wherein the uprights have an interior wall, and the interior wall has an adjustable mounting system for attaching to the cross bar so that the height of the cross bar can be adjusted in response to the location of the pipe system components.

10. The modular frame assembly as set forth in claim 1 wherein the cross bar is fixedly attached to the uprights at a predetermined height which is determined in response to the location of the pipe system components.

11. The modular frame assembly as set forth in claim 1 comprising a set of first uprights have a first height and a set of second uprights have a second height which is different from the height of the first uprights, wherein the skid is formed by selecting uprights from the first and second set of uprights in response to the height of the pipe system components.

12. The modular frame assembly as set forth in claim 1 wherein the base is formed by selecting the legs for the base from a predetermined set of legs having at least two different types of legs.

13. The modular frame assembly as set forth in claim 1 wherein the base is formed by selecting the lateral supports from a predetermined set of lateral supports having at least two different types of lateral supports.

14. The modular frame assembly as set forth in claim 1 wherein the skid is formed by selecting the component support member from a predetermined set of hangers which correspond to at least two pipe diameters used in the pipe system.

15. The modular frame assembly as set forth in claim 1 wherein the skid is formed by selecting the component supports from a predetermined set of flange mounts which correspond to at least two pipe valve sizes.

16. A method for assembling a modular filtration assembly for holding components of a pipe system on a substantially horizontal surface, the pipe system having a first pipe system component having a first diameter and centerline and second pipe system component having a second diameter and centerline which are different from the first diameter and centerline, comprising:
providing a predetermined plurality of legs, lateral leg supports, uprights, cross bars, and component support members;
forming a first base by selecting two or more legs and at least one lateral leg support in response to the load of the pipe system, and attaching the legs and lateral leg supports together so that the two legs and lateral leg support engage the surface and are substantially parallel to the surface;
forming a first spine by selecting at least two uprights in response to the height of the pipe system components, and at least one cross bar from the predetermined set of uprights and cross bars, and attaching the uprights and cross bar together so that the cross bar is disposed between the two uprights;
forming a first skid by attaching bottom ends of the uprights to the base leg so that the uprights extend upwardly in a substantially perpendicular direction from the base;
attaching a lateral arm to each cross bar so that the lateral arm projects outwardly in a substantially perpendicular direction from the cross bar; and
selecting a first component support member in response to the first pipe system component which needs to be supported, and attaching the component support member to the lateral arm so that the first centerline is substantially parallel to the cross bar.

17. A method for assembling a modular filtration assembly as set forth in claim 16 wherein forming the spine includes positioning a height of the cross bar in response to the height of the pipe system component.

18. A method for assembling a modular filtration assembly as set forth in claim 17 wherein positioning a height of the cross bar in response to the height of the pipe system component includes releasably attaching the cross bar to an interior wall of the upright.

19. A method for assembling a modular filtration assembly as set forth in claim 17 wherein positioning a height of the cross bar in response to the height of the pipe system component includes welding the cross bar to an interior wall of the upright.

20. A method for assembling a modular filtration assembly as set forth in claim 16 wherein attaching the component support member to the spine includes sliding a support bracket of the component support member along the cross bar into a position determined by the location of the pipe system component, and securing the component support member by connecting the support bracket to the cross bar.

21. A method for assembling a modular filtration assembly as set forth in claim 16 wherein forming the spine includes selecting uprights from a predetermined set of uprights which have at least two different heights in response to the height of the pipe system components.

22. A method for assembling a modular filtration assembly as set forth in claim 16 wherein forming the base includes selecting the legs for the base from a predetermined set of legs having at least two different types in response to the load of the pipe system.

23. A method for assembling a modular filtration assembly as set forth in claim 16 wherein forming the base includes selecting the lateral leg supports from a predetermined set of lateral leg supports having at least two different types in response to the load of the pipe system.

24. A method for assembling a modular filtration assembly as set forth in claim 16 wherein selecting at least one component support member includes selecting the component support member from a predetermined set of hangers which correspond to at least two different pipe diameters used in the pipe system.

25. A method for assembling a modular filtration assembly as set forth in claim 16 wherein selecting at least one component support member includes attaching a hanger to a cross bar of the skid, and selecting a saddle from a predetermined set of saddles, each saddle having a cross section to receive and hold a predetermined pipe having a predetermined pipe diameter and centerline at the same vertical distance relative to the cross bar, and attaching the saddle to the hanger so as to maintain the same pipe centerline for all pipes supported by the skid regardless of pipe diameter.

26. A method for assembling a modular filtration assembly as set forth in claim 16 wherein selecting at least one component support member includes selecting the component support member from a predetermined set of flange bolt brackets which corresponding to at least two pipe valve sizes.

27. A method for assembling a modular filtration assembly as set forth in claim 26 wherein selecting at least one component support member includes attaching to the hanger a flange bracket having a predetermined cross section to receive and hold a predetermined pipe valve having a predetermined centerline at the same vertical distance relative to the cross bar, thereby maintaining the same centerline for all pipe system components supported by the skid regardless of component diameter.

28. A method for assembling a modular filtration assembly for holding components of a pipe system on a substantially horizontal surface, the pipe system having a first pipe system component having a first diameter and centerline and second pipe system component having a second diameter and centerline which are different from the first diameter and centerline, comprising:

providing a predetermined plurality of legs, lateral leg supports, uprights, cross bars, and component support members;

forming first and second bases, each base formed by selecting two or more legs and at least one lateral leg support in response to the load of the pipe system, and attaching the legs and lateral leg supports together so that the legs and lateral leg support engage the surface and are substantially parallel to the surface;

forming first and second spines, each spine formed by selecting at least two uprights in response to the height of the pipe system components, and at least one cross bar from the predetermined set of uprights and cross bars, and attaching the uprights and cross bar together so that the cross bar is disposed between the two uprights;

forming first and second skids by attaching bottom ends of the first and second spines to the first and second bases, respectively, so that the respective uprights extend upwardly in a substantially perpendicular direction from the respective bases;

positioning the first and second skids so that the cross bars are end to end and are substantially parallel to each other;

selecting at least one a first component support member in response to the first pipe system component which needs to be supported, and attaching the component support member to the cross bar of the first skid so that the first centerline is substantially parallel to the cross bar;

selecting a second component support member in response to the second pipe system component which needs to be supported, and attaching the component support member to the cross bar of the first skid so that the second centerline is substantially parallel to the cross bar; and adjusting the height of the cross bar so that the centerlines of the first and second pipe system components are at the same height and that first and second pipe system components may be attached to each other.

\* \* \* \* \*